US011885404B2

United States Patent
Brolles

(10) Patent No.: US 11,885,404 B2
(45) Date of Patent: Jan. 30, 2024

(54) DIFFERENTIAL HOUSING FOR A DIFFERENTIAL UNIT OF A VEHICLE

(71) Applicant: VOLVO TRUCK CORPORATION, Gothenburg (SE)

(72) Inventor: Vincent Brolles, Saint Laurent de Mure (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/147,562

(22) Filed: Dec. 28, 2022

(65) Prior Publication Data

US 2023/0202295 A1    Jun. 29, 2023

(30) Foreign Application Priority Data

Dec. 28, 2021    (EP) .................................. 21217916

(51) Int. Cl.
*F16H 48/40*    (2012.01)
*F16H 57/029*   (2012.01)
(Continued)

(52) U.S. Cl.
CPC .......... *F16H 57/029* (2013.01); *F16H 48/08* (2013.01); *F16H 48/40* (2013.01); *F16H 57/037* (2013.01);
(Continued)

(58) Field of Classification Search
CPC ........ F16H 48/08; F16H 48/40; F16H 57/029; F16H 57/037; F16H 57/0424;
(Continued)

(56) References Cited

U.S. PATENT DOCUMENTS 2,463,091 A * 3/1949 Dortort ................... F16H 48/27
475/90
2,627,190 A * 2/1953 Bottcher ................. F16H 48/27
188/292
(Continued)

FOREIGN PATENT DOCUMENTS

| JP | 7-19659 U | 4/1995 |
| JP | H9144853 A | 6/1997 |
| WO | 2019192729 A1 | 10/2019 |

OTHER PUBLICATIONS

English translation of JPH0719659U; http://translatinportal.epo.org; Jul. 18, 2023 (Year: 2023).*

(Continued)

*Primary Examiner* — Roger L Pang
(74) *Attorney, Agent, or Firm* — Venable LLP; Jeffri A. Kaminski

(57) ABSTRACT

A differential housing for a differential unit of a vehicle. The differential housing is configured for receiving a differential and an end portion of each of two drive shafts connected by means of the differential. The differential housing has a longitudinal axis. It comprises a peripheral wall which has a substantially tubular shape, and defines an inner space. The differential housing includes at least one hole which extends through the peripheral wall; and a valve mounted in said hole, the valve being configured to allow the passage of oil towards the inner space, and to allow the passage of oil from the inner space towards the outside only below a predetermined valve closing force.

16 Claims, 4 Drawing Sheets

(51) Int. Cl.
*F16H 48/08* (2006.01)
*F16H 57/037* (2012.01)
*F16H 57/04* (2010.01)
*F16H 57/02* (2012.01)

(52) U.S. Cl.
CPC ..... *F16H 57/0424* (2013.01); *F16H 57/0483* (2013.01); *F16H 2057/02052* (2013.01)

(58) Field of Classification Search
CPC ....... F16H 57/0483; F16H 2057/02052; F16H 57/0421
USPC .................... 475/160, 230; 74/606 S, 606 R; 184/6.12, 70
See application file for complete search history.

(56) References Cited

U.S. PATENT DOCUMENTS

| | | | |
|---|---|---|---|
| 3,049,943 A * | 8/1962 | Frentzel | ................. F16H 48/27 475/90 |
| 2013/0274054 A1 | 10/2013 | Barillot | |
| 2015/0354691 A1 | 12/2015 | Keeney et al. | |

OTHER PUBLICATIONS

European Search Report in corresponding European Application No. 21217916.2 dated May 16, 2022 (3 pages).

\* cited by examiner

DIFFERENTIAL HOUSING FOR A DIFFERENTIAL UNIT OF A VEHICLE

TECHNICAL FIELD

The invention relates to a differential housing for a differential unit of a vehicle. The invention also relates to an assembly for a differential unit comprising such a differential housing, to a differential unit of a vehicle, to a driven wheel system comprising such a differential unit, and to a vehicle comprising such a driven wheel system.

BACKGROUND

A vehicle such as a truck is generally equipped with one or several differential units on its driven axles. A differential unit allows the corresponding left and right wheels to have different speeds when turning/maneuvering.

A differential unit typically comprises a differential carrier housing which contains the differential mechanism, i.e.: a crown wheel driven by a pinion secured to an input shaft, a differential arranged inside the crown wheel and comprising pinions and gears, and a differential housing containing the differential and part of drive shafts connected to a wheel of the vehicle. The differential housing can typically be made of two shells each secured to the crown wheel, on both sides thereof, the differential housings thus being mounted in the differential carrier housing.

Differential units need lubrication in order to prevent damages. To that end, the differential carrier housing is partly filled with a lubricant, such as oil, which in operation splashes all over the differential carrier housing inner volume. Furthermore, the differential unit is arranged such that oil can enter the differential housing to allow lubricating the inner pieces. Oil can enter the differential housing by its opposite axial ends, which each receive a drive shaft, and by holes provided in the differential housing peripheral wall for this purpose.

At rest, i.e. when the differential housing is not rotating, or when the rotating speed is low, lubrication is satisfactory.

However, a significant drawback of this arrangement is that, when the differential housing rotating speed is high, oil is ejected outside the differential housing by centrifugal effect, through the holes. As a consequence, there is not enough oil in the differential housing, or even substantially no oil at all.

This is problematic since, when the inner pieces rotate (when the vehicle is taking a corner for instance or when one wheel is slipping whereas the other is not), then these inner parts (pinions, gears, etc.) are not properly lubricated and, consequently, premature wear can occur.

SUMMARY

An object of the invention is to provide a differential unit with an improved lubricating system, to ultimately increase the service life of the differential unit components.

To that end, and according to a first aspect, the invention relates to a differential housing for a differential unit of a vehicle, the differential housing being configured for receiving a differential and an end portion of each of two drive shafts connected by means of the differential. The differential housing has a peripheral wall which has a substantially tubular shape, a longitudinal axis, and it defines an inner space. The differential housing further comprises:

- at least one hole which extends through the peripheral wall;
- and a valve mounted in said hole, the valve being configured to allow the passage of oil towards the inner space, and to allow the passage of oil from the inner space towards the outside only below a predetermined valve closing force.

Thus, the holes on the differential housing allow oil to enter the differential from the inner volume of differential carrier housing, in order to lubricate the inner pieces contained in the differential housing.

Furthermore, the valves allow the differential to be partly filled with an appropriate volume of oil at rest and in operation below a certain rotating speed, but also to keep that oil inside the differential housing above a certain rotating speed, to ensure the proper lubrication of the differential, i.e. the inner pieces located in the differential housing.

The valve closing force corresponds to a predetermined difference between the forces applied to the valve from the inside and from the outside. In operation, it corresponds to a predetermined threshold of the centrifugal force acting on the valve.

In practice, the valves can be equipped with a spring having a defined stiffness corresponding to a defined closing force. The spring is arranged to allow the valve to be open at zero speed and to be closed at a predetermined higher speed. Such a valve closing feature is chosen according to the operation requirements in terms of inner force threshold, which is related to the rotating speed. In particular, the spring force can be fine-tuned to match the required speed threshold at which the valve must switch from an open state to a close state.

The solution to the prior art lubrication problems that is provided by the invention is a passive mechanical solution, which makes it very robust and easy to implement.

The differential housing may comprise at least two holes. These holes are preferably substantially diametrically opposed.

In an embodiment, the differential housing may comprise N holes, where N is comprised between 2 and 12. These holes are preferably arranged on a same plane orthogonal to the longitudinal axis; they are preferably regularly angularly spaced.

When several holes are provided, one valve can be mounted in each hole. Although the invention could work with one or some holes devoid of valve, as it would prevent some oil passage towards the outside, the efficiency is greater if each hole is equipped with a valve.

The differential housing can comprise several cylindrical portions having different diameters, connected by portions which are arranged orthogonal to the longitudinal axis or obliquely, the hole(s) being arranged in a substantially cylindrical portion of the differential housing.

In an embodiment, the cylindrical portions diameters can be small enough for compactness and the cylindrical portion which includes the holes and valves can be adapted to be below the oil level when the differential is not rotating.

In an embodiment, the differential housing may have a central portion comprising two flanges connected to one another on either side of the differential, in the mounted position, and two opposite end portions. With this arrangement, the hole(s) can be arranged in a portion which is distinct from said central portion and said end portions.

In an embodiment, the differential housing may have a central portion comprising two flanges connected to one another on either side of the differential, in the mounted position. With this arrangement, the hole(s) can be arranged in a portion of the differential housing which has the largest diameter, with the exception of the central portion. Indeed, the lower part of a portion having a large diameter is generally below the oil level in the differential carrier housing at rest (that is when the vehicle is stopped and the differential is not rotating).

The hole(s) can be arranged in a portion of the differential housing which is configured for being placed around a differential side gear which is part of the differential and which is connected, in use, to an end portion of a drive shaft. Said portion is generally the portion of the differential housing which has the largest diameter (with the exception of the central portion comprising two flanges).

The, or at least one, valve can be a check valve. The, or at least one, valve can be a spring loaded reed valve.

According to a second aspect, the invention relates to an assembly for a differential unit, comprising a differential housing as previously described and a differential received in said differential housing, the differential comprising:
two differential side gears, each differential side gear being configured to be connected to a drive shaft capable of being connected to a wheel of a vehicle and being rotatably mounted relative to the differential housing around the longitudinal axis;
differential side pinions which rotate relative to a joint cross configured to be attached to a crown wheel of the differential unit, each differential side gear being connected to at least one differential side pinion.

According to a third aspect, the invention relates to a differential unit of a vehicle, the differential unit comprising a differential carrier housing, and, mounted in said differential carrier housing:
an assembly as previously described;
a crown wheel having a longitudinal axis which coincides with the differential housing longitudinal axis, the crown wheel being arranged to be driven in rotation around said longitudinal axis by an input shaft;
wherein:
the differential is partly arranged inside the crown wheel, the joint cross being attached to the crown wheel;
and the differential housing comprises two shells arranged on both sides of the crown wheel, each shell having a first end portion secured to the crown wheel and to the first end portion of the other shell, and a second end portion which is opposed the first end portion and which is configured, in use, to be placed around one drive shaft.

The drive shaft is capable of being connected to a wheel of a vehicle, outside the differential carrier housing.

In an embodiment, one shell is partly located inside the crown wheel, and only the other shell comprises hole(s). In other words, the holes are provided in the shell that is not inside the crown wheel. This ensures that the oil passage is not hindered by the crown wheel.

According to a fourth aspect, the invention relates to a driven wheel system for a vehicle, comprising:
a differential unit as previously described;
two drive shafts, each drive shaft having one end connected to one differential side gear of the differential unit, and one end connected to at least one wheel, outside the differential carrier housing.

In an embodiment, so-called "rigid axle", the driven wheel system forms an axle and comprises an axle housing which constitutes a second housing portion designed to be assembled to a first housing portion for forming the differential carrier housing, and which at least partially contains the drive shafts. In another embodiment, so-called "IRS" (independent wheels), each wheel is connected to the differential unit by means of a drive shaft, at least one joint, a lower arm articulated at both ends and preferably an upper arm articulated at both ends.

The driven wheel system may further comprise a sealing gasket arranged between the drive shaft and the second end portion of each shell of the differential housing. Having a sealing gasket improves the efficiency as it prevents oil from being ejected outside the differential housing through the differential housing opposite axial ends.

According to a fifth aspect, the invention relates to a vehicle comprising at least one driven wheel system as previously described.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
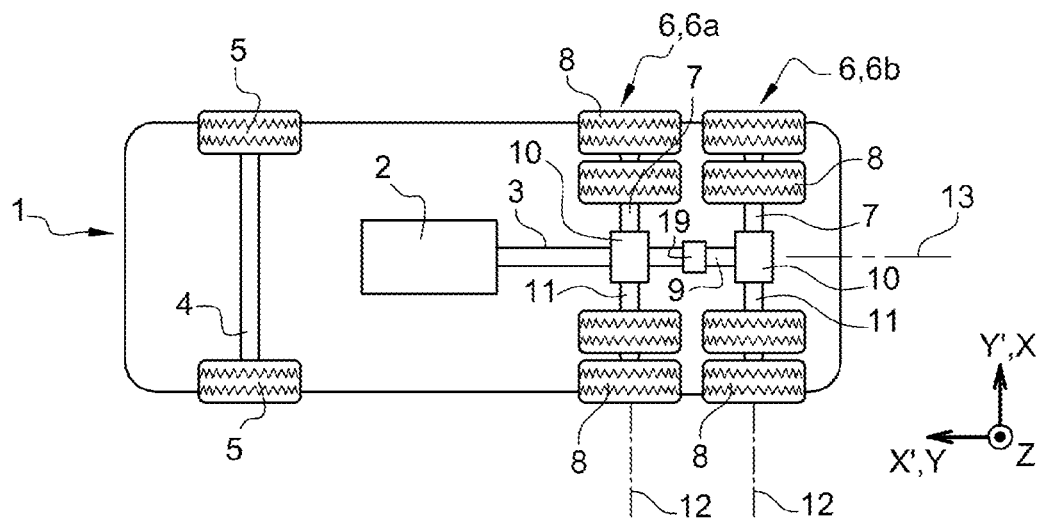
FIG. 1 is a schematic drawing of an underside of a vehicle showing a driven wheel system including a differential unit according to an embodiment of the invention.

As shown in FIG. 1, a vehicle 1 comprises an engine 2 that drives an input shaft 3 having an axis 13, and a front axle 4 connected to front wheels 5.

The vehicle 1 also comprises at least one driven wheel system 6. The, or each driven wheel system 6 has an axis 12, and comprises a differential unit 10, which includes a differential 15, and at least partly two drive shafts 11. Each drive shaft 11 has a first end connected to the differential 15 and a second end connected to at least one wheel 8.

In the illustrated embodiment, the vehicle 1 comprises a first driven rear wheel system 6a and a second driven rear wheel system 6b located rearwards from the first driven rear wheel system 6a. Each rear wheel system 6a, 6b can comprise two wheels 8 on either side, thus forming a dual mounted tires arrangement. An additional shaft 9 connects the input shaft 3 to the differential unit 10 of the second driven rear wheel system 6b, through the differential unit 10 of the first driven rear wheel system 6a, and is the input shaft for the differential unit 10 of the second driven rear wheel system 6b. The vehicle 1 may further comprise an interaxle differential system 19. This embodiment should not be considered as limiting.

The driven wheel system 6 can form an axle which comprises an axle housing 7 containing the differential 15 and part of the drive shafts 11. The axle housing 7 can constitute a second housing portion designed to be assembled to a first housing portion for forming a differential carrier housing.

The invention can be applied in heavy-duty vehicles, such as trucks, buses and construction equipment, as well as medium-duty vehicles. The invention could be applied to any type of differential, on a conventional diesel propelled vehicle, a BEV (Battery Electric Vehicle), or a FCEV (Fuel Cell Electric Vehicle).

Although the following description is made with reference to a rear wheel system, it has to be noted that the invention can be used on another driven wheel system, for example on a driven front wheel system.

Reference is now made to FIGS. 2 to 6.

The differential unit 10 comprises a differential carrier housing 20, which can made of a first housing portion 20a and a second housing portion (not shown) secured to one another by means of appropriate fasteners (not shown). In the vehicle 1 illustrated in FIG. 1, one of the first and second housing portions can be formed by the axle housing 7.

Inside the differential carrier housing 20 is located a crown wheel 22 having a longitudinal axis 23. The crown wheel 22 is driven in rotation around said longitudinal axis 23 by the input shaft 3, by engagement of teeth arranged on a pinion 14 mounted on said input shaft 3 and teeth arranged on the crown wheel 22.

Figure 2:
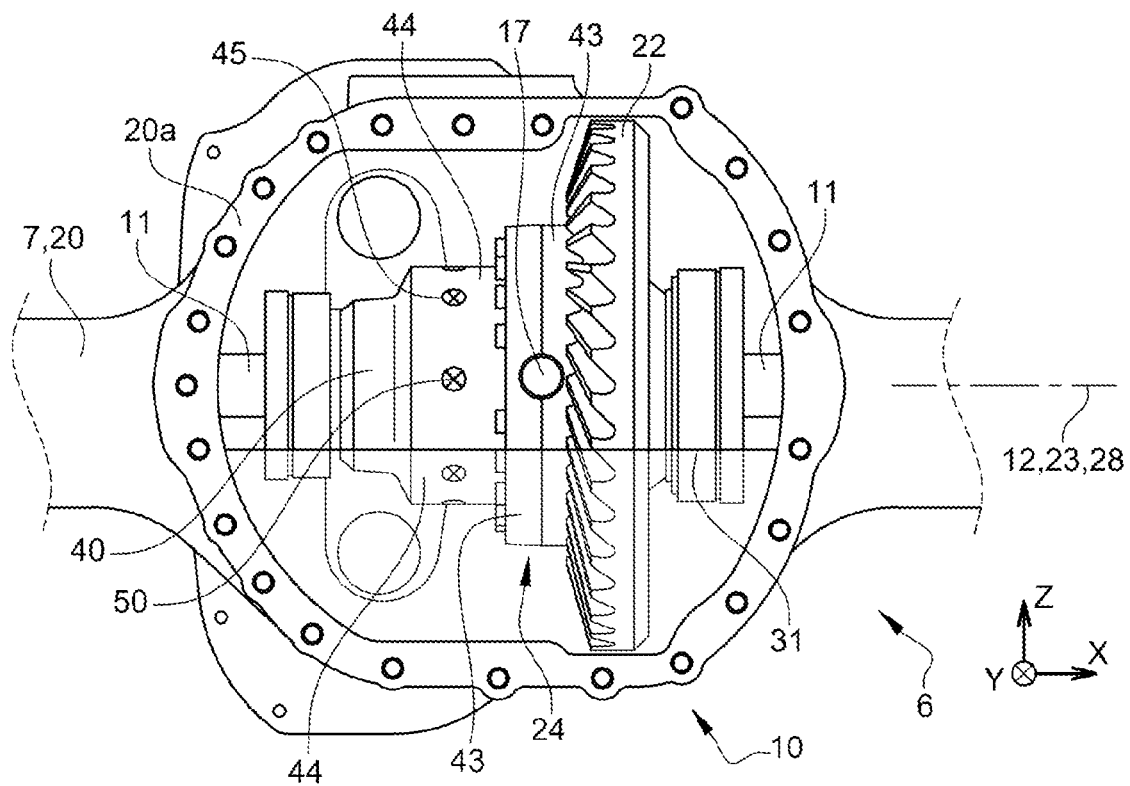
FIG. 2 is a partial view of a differential carrier housing, showing some inner components, in particular a crown wheel, a differential housing and drive shafts.
Figure 3:
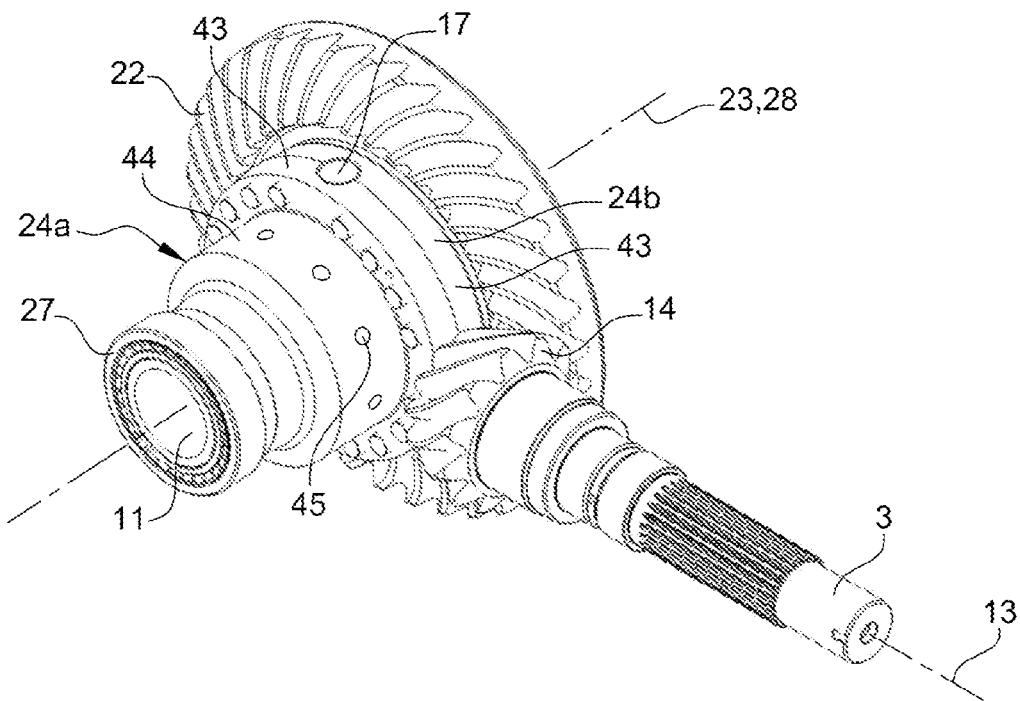
FIG. 3 is a perspective view of the differential housing, the crown wheel and an input shaft meshing with the crown wheel.
Figure 4:
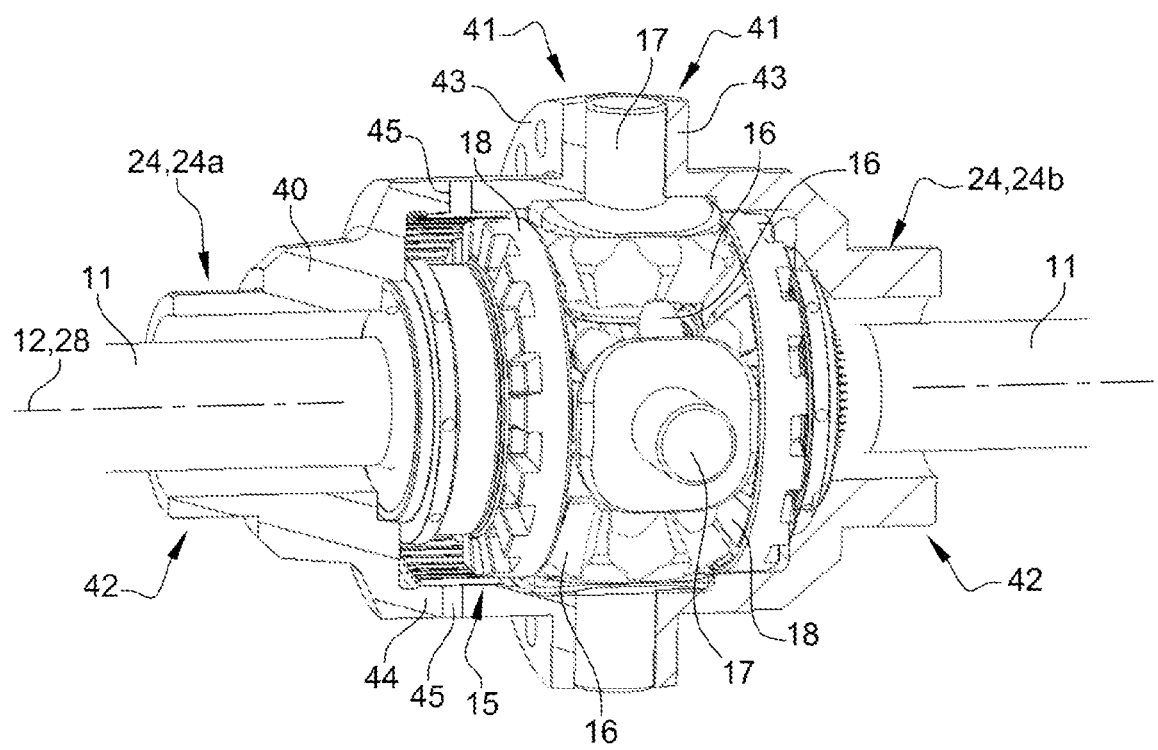
FIG. 4 is a partly cut view of the differential housing and the differential contained therein.
Figure 5:
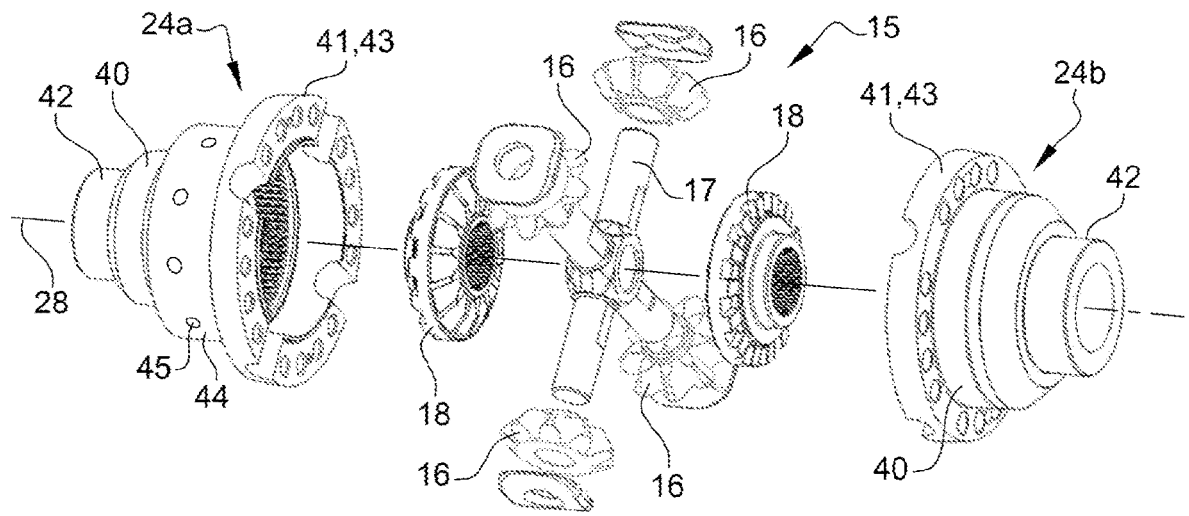
FIG. 5 is an exploded view of the differential housing and the differential.

As shown in FIG. 2, the longitudinal direction X is defined as a direction parallel to the longitudinal axis 23 of the crown wheel 22. In the operating position, i.e., when the differential unit is mounted under the vehicle 1, as shown in FIG. 1, the longitudinal direction X corresponds the transverse direction Y' of the vehicle 1, i.e., the axes 12 of the driven wheel systems 6. Direction X is substantially horizontal when the vehicle 1 is on a horizontal surface.

Besides, the transverse direction Y is defined as the direction which is orthogonal to the longitudinal direction X and substantially horizontal when the vehicle 1 is on a horizontal surface. Direction Y corresponds the longitudinal direction X' of the vehicle 1. The axis 13 of the input shaft 3 is parallel to the transverse direction Y, i.e., the longitudinal direction X' of the vehicle 1.

Moreover, direction Z is defined as the vertical direction—when the vehicle 1 is on a horizontal surface.

The invention will be described when the vehicle 1 is on a horizontal surface.

The differential unit 10 comprises a differential 15 which is partly arranged inside the crown wheel 22. The differential 15 comprises differential side pinions 16, for example four differential side pinions, which are fitted on a joint cross 17 attached to the crown wheel 22. Each differential side pinion 16 is free to rotate with respect to an arm of the joint cross 17 to which it is fitted. The differential 15 also comprises two differential side gears 18. Each differential side gear 18 meshes with at least one differential side pinion 16 and is fastened to a first end of one of the drive shafts 11.

The differential unit 10 further comprises, inside the differential carrier housing 20, a differential housing 24 which contains the differential 15 and part of the drive shafts 11, namely the part of each drive shaft 11 which is located near the first end of said drive shaft 11. The differential housing 24 is secured to the crown wheel 22, and the joint cross 17 is attached to the differential housing 24, thus being attached to the crown wheel 22. It may be made of two parts, namely two shells 24a, 24b each forming a sleeve around the corresponding differential side gears 18 and partly around the drive shaft 11, said shells 24a, 24b being fastened to the crown wheel 22 and extending along opposite directions from the crown wheel 22. The differential housing 24 has a longitudinal axis 28 which is coincident with the crown wheel longitudinal axis 23.

Thus, on each side of the crown wheel 22, the differential side gear 18 is mounted at the first end of the drive shaft 11 in a rotationally fixed manner. Furthermore, both the differential side gear 18 and the drive shaft 11 are rotatably mounted relative to the differential shell 24a, 24b around the longitudinal axis 23.

The crown wheel 22, differential 15, and differential housing 24 are rotating parts inside and with respect to the differential carrier housing 20. They are mounted on the inner side of the differential carrier housing 20 by means of two supporting devices 30, arranged on both sides of the crown wheel 22. Each supporting device 30 is attached to the differential carrier housing 20 and comprises a ring-shaped portion in which is received part of one drive shaft 11 inside a differential shell 24a, 24b and a bearing 27 surrounding the differential shell 24a, 24b. More specifically, the bearing 27 can have an inner ring mounted on the differential shell 24a, 24b and an outer ring mounted on the supporting device 30. The bearings 27 are preferably tapered roller bearings.

The differential housing 24 is now more specifically described.

The differential housing 24 has a peripheral wall 40 which has a substantially tubular shape and defines an inner space.

Each shell 24a, 24b has a first end portion 41 secured to the crown wheel 22 and to the first end portion 41 of the other shell 24b, 24a, and a second end portion 42 which is opposed the first end portion 41 and which is configured, in use, to be placed around one drive shaft 11. The first end portions 41 of the shells 24a, 24b form the central portion of the differential housing 24, while the second end portions 42 form two opposite end portions of the differential housing 24.

Figure 6:
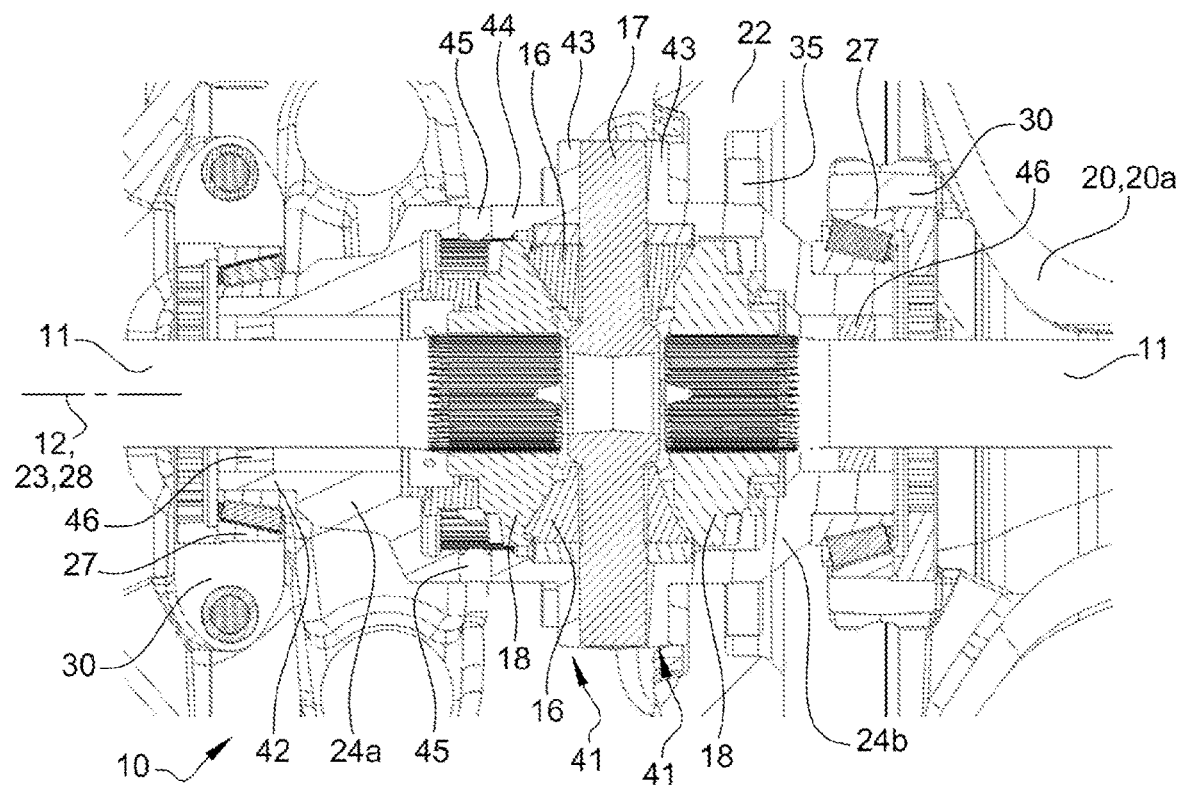
FIG. 6 is a partial cross section view of the differential carrier housing showing the differential housing, differential and drive shafts.
Figure 7:
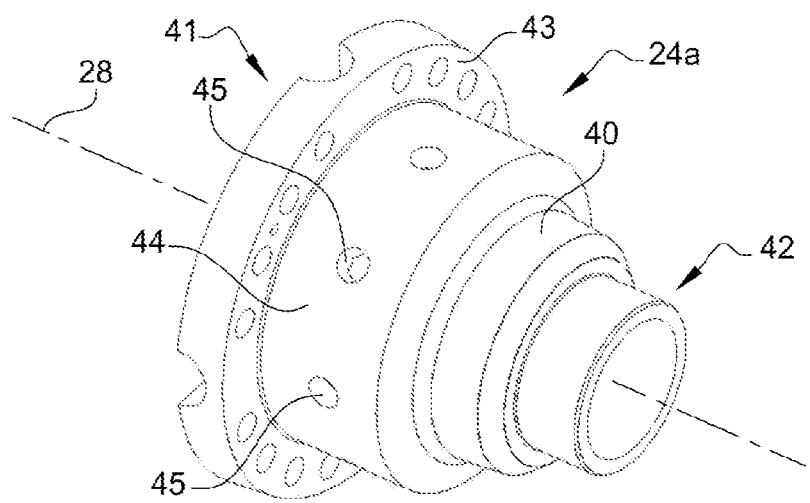
FIG. 7 is a perspective view of one shell of the differential housing.

The first end portion 41 of each shell 24a, 24b comprises a flange 43. The flanges 43 are connected to one another on either side of the differential 15. More precisely, when the flanges 43 are connected to one another, the joint cross 17 is sandwiched between them. Furthermore, the flanges 43 are arranged on one side of the crown wheel 22 and secured to it by means of fasteners 35 (see FIG. 6). Thus, one shell, namely the right shell 24b on FIG. 6, is partly located inside the crown wheel 22, while the other shell, namely the left shell 24a on FIG. 6, is spaced apart from the crown wheel 22 along the longitudinal axis.

The differential housing 24 comprises several cylindrical portions having different diameters, connected by portions which are arranged orthogonal to the longitudinal axis 28 or obliquely. With such an arrangement, the differential housing 24 is designed so that, over the whole length along the longitudinal axis 28, the differential housing peripheral wall is located fairly close to the parts received in the inner space it defines, these parts having different diameters.

In particular, each shell 24a, 24b has a portion 44 which is configured for being placed around one differential side gear 18. Said portion 44 can be a cylindrical portion adjacent the flange 43.

As shown in FIG. 2, the differential carrier housing 20 is partly filled with a lubricant, such as oil, up to an appropriate level 31. When the vehicle 1 is stopped, this level 31 is preferably below the horizontal plane including axes 12, 23, 28 and above the lower portion of the differential housing 24.

According to the invention, at least one hole 45 extends through the peripheral wall 40 of the differential housing 24, for allowing oil to enter the inner space defined by the differential housing 24.

Oil contained in the differential carrier housing 20 can enter the differential housing 24 through the hole 45 when the differential housing 24 is rotating, because oil splashes all over the differential carrier housing inner volume.

Alternatively, or in addition, in an embodiment, oil can enter the differential housing 24 through the hole 45 because said hole 45 is located below the oil level 31 (as illustrated in FIG. 2), especially when the differential 15 is not rotating. To that end, the hole 45 may be arranged in a portion of the differential housing 24 which has the largest diameter (with the exception of the central portion 41). For example, the hole 45 may be arranged in portion 44 which is configured for being placed around one differential side gear 18.

The hole 45 can be arranged in a substantially cylindrical portion of the differential housing peripheral wall 40. It can be arranged in a portion which is distinct from the central portion 41 and from the end portions 42 of the differential housing 24.

There may be provided several such holes 45, for example between 2 and 12. The holes 45 can be arranged on a same plane orthogonal to the longitudinal axis 28 of the differential housing 24, and are preferably regularly angularly spaced.

In the illustrated embodiment, only one shell is provided with holes 45. Said shell can be the shell 24b which is spaced apart from the crown wheel 22 along the longitudinal axis.

Furthermore, according to the invention, one valve 50 is mounted in the hole 45. When several holes 45 are provided, preferably one valve 50 is mounted in each hole 45. The valve 50 is configured to allow the passage of oil towards the inner space defined by the differential housing, and to allow the passage of oil from the inner space towards the outside only below a predetermined inner force threshold. In other words, the holes 45 and valves 50 are configured to allow oil to enter the differential housing 24 when it is not rotating, and to prevent oil from escaping when the differential housing 24 is rotating, or at least rotating fast enough to cause oil to be projected by the centrifugal force.

Figure 8:
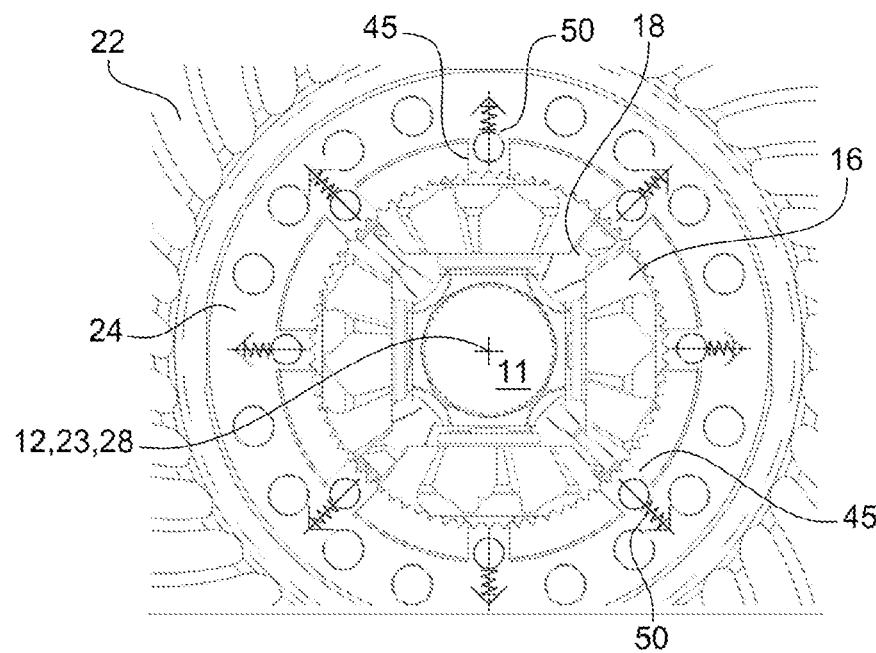
FIG. 8 is a schematic cross section view of the differential housing equipped with valves according to an embodiment.
Figure 9:
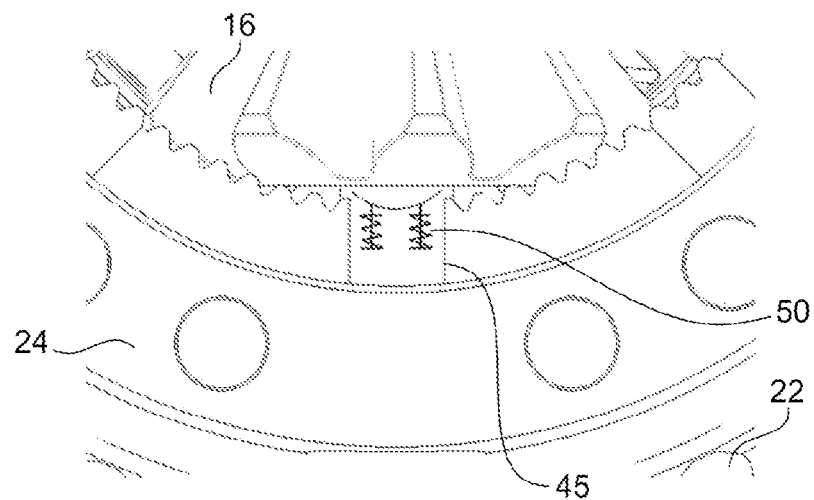
FIG. 9 is a schematic cross section view of a detail of the differential housing equipped with valves according to another embodiment.

The valves 50 are only illustrated in FIGS. 8 and 9, for the sake of clarity.

In the embodiment shown in FIG. 8, there are provided eight holes 45, each one being equipped with a valve 50. The valves 50 are check valves. They are illustrated in their open state.

In the embodiment shown in FIG. 9, the valve 50 is a spring-loaded reed valve. Such a valve is a type of check valve which restricts the flow of fluids to a single direction, opening and closing under changing force on each face. For example, such a valve 50 can comprise a flexible membrane made of metal or of composite material (fiberglass or carbon fiber or elastomeric material for example).

In order to further limit the oil losses, i.e. preventing oil from exiting the differential housing inner space, there may be provided a sealing gasket 46 arranged between the drive shaft 11 and the second end portion 42 of each shell 24a, 24b of the differential housing 24, as illustrated in FIG. 6. Thus, the differential housing 24 is sealed, the only passage for oil being provided by holes 45. Consequently, the amount of oil contained in the differential housing inner space, which results from the overall arrangement and the predetermined oil level 31 illustrated in FIG. 2, can remain substantially constant whatever the rotational speed, which ensures a satisfactory lubrication of the inner pieces.

It is to be understood that the present invention is not limited to the embodiments described above and illustrated in the drawings; rather, the skilled person will recognize that many changes and modifications may be made within the scope of the appended claims.

The invention claimed is:

1. A differential housing for a differential unit of a vehicle, the differential housing being configured for receiving a differential and an end portion of each of two drive shafts connected by means of the differential, the differential housing having a peripheral wall which has a substantially tubular shape, the differential housing further having a longitudinal axis and defining an inner space, characterized in that the differential housing comprises: —at least one hole which extends through the peripheral wall; —and a valve mounted in said hole, the valve being configured to allow passage of oil towards the inner space, and to allow the passage of oil from the inner space towards an outside only below a predetermined valve closing force.

2. The differential housing according to claim 1, further comprising at least two holes, said holes being substantially diametrically opposed.

3. The differential housing according to claim 1, further comprising N holes, where N is comprised between 2 and 12, the holes being arranged on a same plane orthogonal to the longitudinal axis and being regularly angularly spaced.

4. The differential housing according to claim 2, wherein one valve is mounted in each hole.

5. The differential housing according to claim 1, wherein the differential housing comprises several cylindrical portions having different diameters, connected by portions which are arranged orthogonal to the longitudinal axis or obliquely, and in that the hole(s) is(are) arranged in a substantially cylindrical portion of the differential housing.

6. The differential housing according to claim 1, wherein the differential housing has a central portion comprising two flanges connected to one another on either side of the differential, in the mounted position, and two opposite end portions, and in that the hole(s) is(are) arranged in a portion which is distinct from said central portion and said end portions.

7. The differential housing according to claim 1 wherein the differential housing has a central portion comprising two flanges connected to one another on either side of the differential, in the mounted position, and in that the hole(s) is(are) arranged in a portion of the differential housing which has the largest diameter, with the exception of the central portion.

8. The differential housing according to claim 1, wherein the hole(s) is(are) arranged in a portion of the differential housing which is configured for being placed around a differential side gear which is part of the differential and which is connected, in use, to an end portion of a drive shaft.

9. The differential housing according to claim 1, wherein the valve, or at least one of the valves is a check valve.

10. The differential housing according to claim 1, characterized in that the valve, or at least one of the valves is a spring-loaded reed valve.

11. An assembly for a differential unit, comprising a differential housing according to claim 1 and a differential received in said differential housing, the differential comprising:
- two differential side gears, each differential side gear being configured to be connected to a drive shaft capable of being connected to a wheel of a vehicle and being rotatably mounted relative to the differential housing around the longitudinal axis;
- differential side pinions which rotates relative to a joint cross configured to be attached to a crown wheel of the differential unit, each differential side gear being connected to at least one differential side pinion.

12. A differential unit of a vehicle, the differential unit comprising a differential carrier housing, and, mounted in said differential carrier housing: —an assembly according to claim 11; —a crown wheel having a longitudinal axis which coincides with the differential housing longitudinal axis, the crown wheel being arranged to be driven in rotation around said longitudinal axis by an input shaft; wherein: —the differential is partly arranged inside the crown wheel, the joint cross being attached to the crown wheel; —and the differential housing comprises two shells, each shell having a first end portion secured to the crown wheel and to the first end portion of the other shell, and a second end portion which is opposed the first end portion and which is configured, in use, to be placed around one drive shaft.

13. The differential unit according to claim 12, wherein one shell is partly located inside the crown wheel, characterized in that only the other shell comprises hole(s).

14. A driven wheel system for a vehicle, comprising:
- a differential unit according to claim 12;
- two drive shafts, each drive shaft having one end connected to one differential side gear of the differential unit, and one end connected to at least one wheel, outside the differential carrier housing.

15. The driven wheel system of claim 14, further comprising a sealing gasket arranged between the drive shaft and the second end portion of each shell of the differential housing.

16. A vehicle comprising at least one driven wheel system according to claim 15.

* * * * *